(12) United States Patent
Cheng

(10) Patent No.: US 7,152,052 B2
(45) Date of Patent: Dec. 19, 2006

(54) APPARATUS AND METHOD OF CONTROLLING SINGLE-INPUT-MULTI-OUTPUT SYSTEMS

(76) Inventor: George Shu-Xing Cheng, 2868 Prospect Park Dr. Suite 300, Rancho Cordova, CA (US) 95670

( * ) Notice: Subject to any disclaimer, the term of this patent is extended or adjusted under 35 U.S.C. 154(b) by 315 days.

(21) Appl. No.: 10/916,084

(22) Filed: Aug. 11, 2004

(65) Prior Publication Data

US 2005/0038532 A1 Feb. 17, 2005

(51) Int. Cl.
  *G05B 13/02* (2006.01)
(52) U.S. Cl. .................. 706/23; 700/42; 700/44; 700/45; 700/48; 700/53
(58) Field of Classification Search ............. 706/23; 700/42, 44, 45, 48, 53
  See application file for complete search history.

(56) References Cited

U.S. PATENT DOCUMENTS

| | | | |
|---|---|---|---|
| 6,055,524 A | 4/2000 | Cheng | |
| 6,360,131 B1 | 3/2002 | Cheng | |
| 6,556,980 B1 | 4/2003 | Cheng | |
| 6,622,521 B1* | 9/2003 | Seiver et al. | 62/656 |
| 6,684,112 B1 | 1/2004 | Cheng | |
| 6,684,115 B1 | 1/2004 | Cheng | |
| 6,970,750 B1* | 11/2005 | Wojsznis et al. | 700/28 |
| 2002/0017113 A1* | 2/2002 | Seiver et al. | 62/656 |

2005/0004687 A1 1/2005 Cheng

OTHER PUBLICATIONS

"Neuro-Control for Single-Input Multi-Output Systems", Omatu, S.; Kishida, Y.; Yoshioka, M.; Knowledge-Based Intelligent Electronic Systems, 1998. Proceedings KES '98. 1998 Second International Conference on, vol. 1, Apr. 21-23, 1998 pp. 202-205.*
"An advanced tracking controller with neural networks for servo systems", Boyagoda, P.B.; Nakaoka, M.; Industrial Electronics, IEEE Transactions on, vol. 47, Issue 1, Feb. 2000, pp. 219-222.*
"PID Controller", eCircuit Center, http://www.ecircuitcenter.com/Circuits/pid1/pid1.htm.*

(Continued)

*Primary Examiner*—David Vincent
*Assistant Examiner*—Mai T. Tran
(74) *Attorney, Agent, or Firm*—Peter R. Leal; DLA Piper US LLP

(57) ABSTRACT

An apparatus and method is disclosed for automatically controlling single-input-multi-output (SIMO) systems or processes. The control output signals of a plurality of single-input-single-output (SISO) automatic controllers are combined by a combined output setter so that these SISO controllers are converted to a multi-input-single-output (MISO) automatic controller based on certain criteria; and its resulting controller output signal is able to manipulate only one actuator to control a plurality of continuous process variables or attempt to minimize a plurality of error signals between the setpoints and their corresponding process variables. Without the need of building process mathematical models, this inventive apparatus and method is useful for automatically controlling unevenly paired multivariable systems or processes where there are less system inputs than outputs including but not limited to industrial furnaces, rapid thermal processing (RTP) chambers, chemical mechanical planarization (CMP) systems, and distillation columns.

34 Claims, 9 Drawing Sheets

OTHER PUBLICATIONS

USPTO Filing Receipt mailed Jul. 3, 2003, Specification and Drawings of U.S. Appl. No. 60/474,688, filed on May 30, 2003, applicant: George Shu-Xing Cheng.

USPTO Filing Receipt mailed Nov. 5, 2003, Specification and Drawings of U.S. Appl. No. 60/494,488, filed on Aug. 12, 2003; applicant: George Shu-Xing Cheng.

USPTO Filing Receipt mailed Dec. 2, 2004, Specification, Claims and Drawings of U.S. Appl. No. 10/969,485, filed on Oct. 19, 2004, applicants: George Shu-Xing Cheng and Steven L. Mulkey.

USPTO Filing Receipt mailed Dec. 12, 2003, Specification and Drawings of U.S. Appl. No. 60/513,126, filed on Oct. 20, 2003, applicants: George Shu-Xing Cheng and Steven L. Mulkey.

* cited by examiner

APPARATUS AND METHOD OF CONTROLLING SINGLE-INPUT-MULTI-OUTPUT SYSTEMS

The subject of this patent relates to automatic control of single-input-multi-output (SIMO) systems including industrial processes, equipment, facilities, buildings, homes, devices, engines, robots, vehicles, aircraft, space-vehicles, appliances and other systems, and more particularly to a method and apparatus for automatically controlling two or more continuous process variables by manipulating only one actuator.

In control system applications, it is relatively easy to control single-input-single-output (SISO) systems or multi-input-multi-output (MIMO) systems that have the same amount of manipulated variables as system inputs and controlled process variables as system outputs. In practice, we often have to deal with unevenly paired multivariable systems, where the number of manipulated variables is greater or smaller than the controlled process variables. Depending on the number of system inputs and outputs, we categorize them as multi-input-single-output (MISO) systems and single-input-multi-output (SIMO) systems. These systems are much more difficult to control using conventional control methods.

In U.S. patent application No. 60/474,688, we presented a method and apparatus for controlling MISO systems. In this patent, we introduce a method and apparatus for controlling SIMO systems.

Single-input-multi-output (SIMO) systems are found in situations where one manipulated variable affects 2 or more process variables that need to be controlled. In these cases, there are no other manipulated variables that we can use to form several single-input-single-output (SISO) systems or one evenly paired multi-input-multi-output (MIMO) system. For instance,

- An industrial furnace for glass melting or metal reheating typically has multiple temperature zones that need to be controlled. The number of fuel flows manipulated by control valves is typically less than the total number of temperature zones measured. In this case, we may have to design the control system to include one evenly paired MIMO system and one or more 1-input-2-output (1×2) systems.
- A Rapid Thermal Processing (RTP) chamber for semiconductor wafer treatment or space material testing has many temperature zones to control. The temperature setpoints can ramp up from room temperature to a few thousand degrees Fahrenheit within 30 seconds and then ramp down. The control objective is to force each temperature point to tightly track its setpoint trajectory. However, since the number of lamps used to heat the chamber may be less than the number of temperature zones to be controlled, we are facing an unevenly paired multivariable system.
- A Chemical Mechanical Planarization (CMP) system for semiconductor wafer planarization applies pressure to the polishing pad to control the thickness of the thin film deposited on the wafer. The number of pressure actuators is typically less than the number of measured thickness points. When the wafer size increases from 200 mm to 300 mm and higher, this problem becomes more severe since the measured thickness points will increase dramatically. We then have to deal with a large number of SIMO systems to control one CMP system.
- A distillation column used for separating a liquid or vapor mixture into component fractions of desired purity has many process variables. A reboiler brings the liquid at the bottom to the boiling point where the component with a lower boiling point will evaporate. Plates inside the column shell enhance the separation. The reboiler steam flow is usually the appropriate manipulated variable to use to control the bottom temperature as well as the temperature of multiple plates. In this case, we have to control a 1×2 or 1×M system.

Theoretically, a 1×M system with 1 input and M outputs, where M=2, 3, . . . is not controllable since manipulating only one input variable in its range cannot force its M output variables to move to any point within their ranges. In practice, a typical approach is to control the most important process variable and leave the other variables uncontrolled. In the distillation column example, the bottom temperature may be controlled but the plate temperatures are only monitored or loosely controlled by manipulating the reflux. In this patent, we introduce the method and apparatus to control single-input-multi-output (SIMO) systems.

The term "mechanism" is used herein to represent hardware, software, or any combination thereof. The term "process" is used herein to represent a physical system or process with inputs and outputs that have dynamic relationships.

DESCRIPTION

A. 2-Input-1-Output Model-Free Adaptive (MFA) Controller

Figure 1:
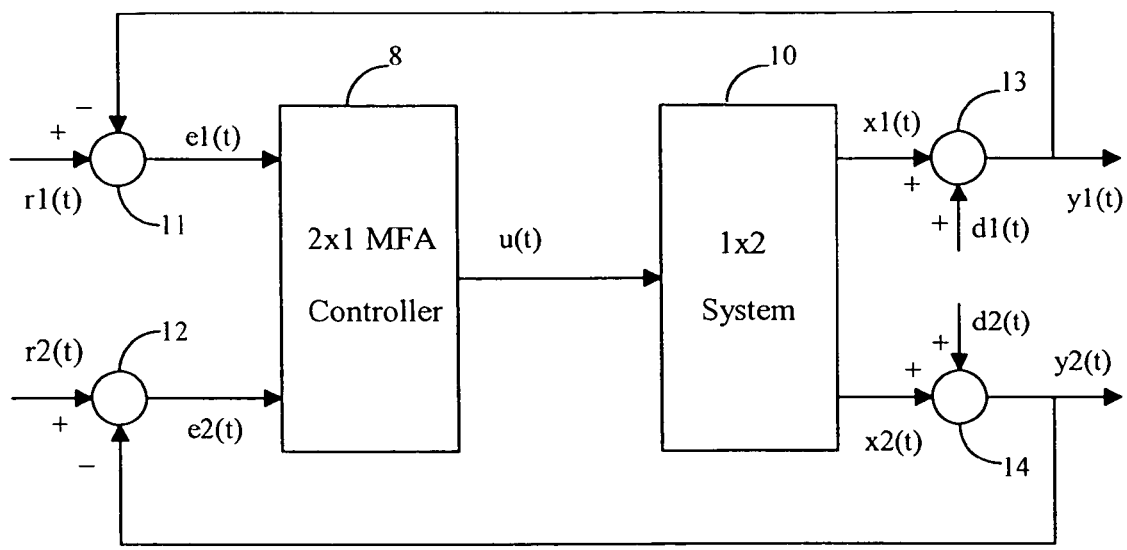
FIG. 1 is a block diagram illustrating a 2-input-1-output (2×1) Model-Free Adaptive (MFA) controller that controls a 1-input-2-output (1×2) system.

FIG. 1 illustrates a 2-input-1-output (2×1) MFA controller that controls a 1-input-2-output (1×2) system. The control system comprises a 2-input-1-output (2×1) MFA controller 8, a 1-input-2-output (1×2) system 10, and signal adders 11, 12, 13, and 14. The signals shown in FIG. 1 are as follows:

$r_1(t)$, $r_2(t)$—Setpoint 1 and Setpoint 2.

$x_1(t)$, $x_2(t)$—System outputs of the 1×2 system.

$d_1(t)$, $d_2(t)$—Disturbance 1 and 2 caused by noise or load changes.

$y_1(t)$, $y_2(t)$—Measured process variables of the 1×2 system, $y_1(t)=x_1(t)+d_1(t)$; and $y_2(t)=x_2(t)+d_2(t)$.

$e_1(t)$, $e_2(t)$—Error between the setpoint and measured process variable, $e_1(t)=r_1(t)-y_1(t)$; and $e_2(t)=r_2(t)-y_2(t)$.

u(t)—Output of the 2×1 MFA Controller.

The control objective is for the controller to produce output u(t) to manipulate the manipulated variable so that the measured process variables $y_1(t)$ and $y_2(t)$ track the given trajectory of their setpoints $r_1(t)$ and $r_2(t)$, respectively, under variations of setpoint, disturbance, and process dynamics. In other words, the task of the MFA controller is to minimize the error $e_1(t)$ and $e_2(t)$ in an online fashion.

Since there is only one manipulated variable, minimizing errors for both loops may not be possible. The control objective then can be defined as (i) to minimize the error for the more critical loop of the two, or (ii) to minimize the error for both loops with no weighting on the importance so that there may be static errors in both loops.

We select the objective function for the MFA control system as $$E_{1S}(t) = \frac{1}{2}e_1(t)^2 \quad (1a)$$
$$= \frac{1}{2}[r_1(t)-y_1(t)]^2.$$

$$E_{2S}(t) = \frac{1}{2}e_2(t)^2 \quad (1b)$$
$$= \frac{1}{2}[r_2(t)-y_2(t)]^2.$$

The minimization of $E_{1s}(t)$ and $E_{2s}(t)$ is achieved by (i) the regulatory control capability of the MFA controller, whose output u(t) manipulates the manipulated variable forcing the process variables $y_1(t)$ and $y_2(t)$ to track the given trajectory of their setpoints $r_1(t)$ and $r_2(t)$, respectively; and (ii) the adjustment of the MFA controller weighting factors that allow the controller to deal with the dynamic changes, large disturbances, and other uncertainties of the control system.

Figure 2:
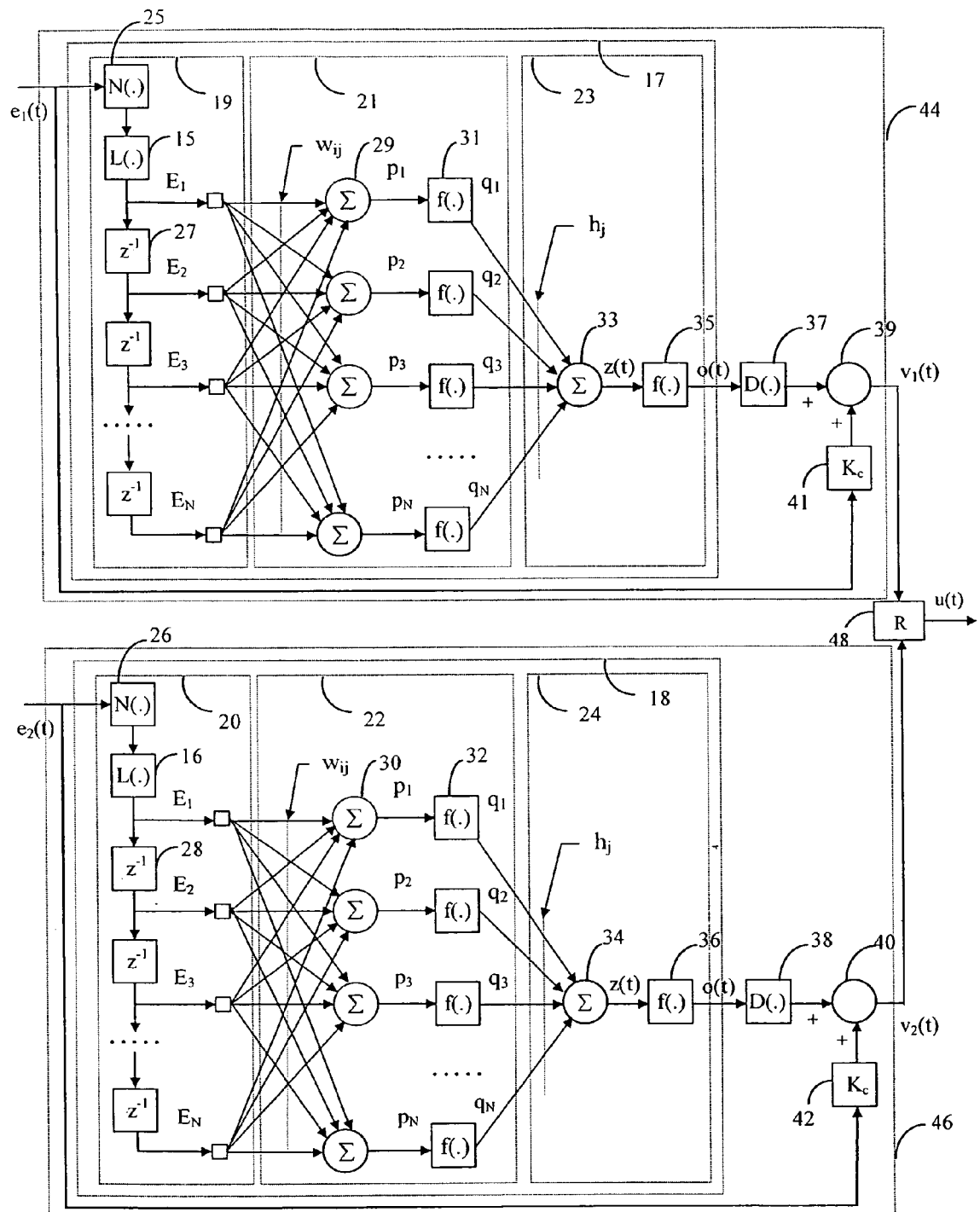
FIG. 2 is a block diagram illustrating the architecture of a 2-input-1-output (2×1) Model-Free Adaptive (MFA) controller.

FIG. 2 illustrates the architecture of a 2-input-1-output Model-Free Adaptive (MFA) controller. Two multilayer neural networks 17, 18 are used in the design of the controller. Each neural network has one input layer 19, 20, one hidden layer 21, 22 with N neurons, and one output layer 23, 24 with one neuron.

Since both neural networks in each controller are identical, we will drop the subscript in the following equations to simplify. The input signal e(t) to the input layer 19, 20 is first converted to a normalized error signal $E_1$ with a range of −1 to 1 by using the normalization unit 25, 26, where N(·) denotes a normalization function. The output of the normalization unit 25, 26 is then scaled by a scaling function L(·) 15, 16:

$$L(.) = \frac{K_c}{T_c}. \quad (2)$$

The value of $E_1$ at time t is computed with function L(·) and N(·):

$$E_1 = \frac{K_c}{T_c}N(e(t)), \quad (3)$$

where $K_c>0$ is defined as controller gain and $T_c$ is the user selected process time constant. $K_c$ is used to compensate for the process steady-state gain and $T_c$ provides information for the dynamic behavior of the process. When the error signal is scaled with these parameters, the controller's behavior can be manipulated by adjusting the parameters.

The $E_1$ signal then goes iteratively through a series of delay units 27, 28, where $z^{-1}$ denotes the unit delay operator. A set of normalized and scaled error signals $E_2$ to $E_N$ is then generated. In this way, a continuous signal e(t) is converted to a series of discrete signals, which are used as the inputs to the neural network. These delayed error signals $E_i$, i=1, 2, . . . N, are then conveyed to the hidden layer through the neural network connections. This is equivalent to adding a feedback structure to the neural network. Then the regular static multilayer neural network becomes a dynamic neural network.

A Model-Free Adaptive controller uses a dynamic block such as a dynamic neural network. A dynamic block is just another name for a dynamic system, whose inputs and outputs have dynamic relationships.

Each input signal can be conveyed separately to each of the neurons in the hidden layer 21, 22 via a path weighted by an individual weighting factor $w_{ij}$, where i=1, 2, . . . N, and j=1, 2, . . . N. The inputs to each of the neurons in the hidden layer are summed by adder 29, 30 to produce signal $p_j$. Then the signal $p_j$ is filtered by an activation function 31, 32 to produce $q_j$, where j denotes the jth neuron in the hidden layer.

A piecewise continuous linear function $f(x)$ mapping real numbers to [0,1] is used as the activation function in the neural network as defined by $$f(x) = 0, \quad \text{if } x < -\frac{b}{a} \quad (4a)$$

$$f(x) = ax+b, \quad \text{if } -\frac{b}{a} \leq x \leq \frac{b}{a} \quad (4b)$$

$$f(x) = 1, \quad \text{if } x > \frac{b}{a} \quad (4c)$$

where a is an arbitrary constant and b=1/2.

Each output signal from the hidden layer is conveyed to the single neuron in the output layer 23, 24 via a path weighted by an individual weighting factor $h_j$, where j=1, 2, . . . N. These signals are summed in adder 33, 34 to produce signal $z(\cdot)$, and then filtered by activation function 35, 36 to produce the output $o(\cdot)$ of the neural network 17, 18 with a range of 0 to 1.

A de-normalization function 37, 38 defined by $$D(x)=100x, \quad (5)$$

maps the $o(\cdot)$ signal back into the real space to produce the controller signal v(t).

The algorithm governing the input-output of the controller is seen by the following difference equations:

$$p_j(n) = \sum_{i=1}^{N} w_{ij}(n)E_i(n), \quad (6)$$

$$q_j(n) = f(p_j(n)), \quad (7)$$

$$o(n) = f\left(\sum_{j=1}^{N} h_j(n)q_j(n)\right), \quad (8)$$

$$= a\sum_{j=1}^{N} h_j(n)q_j(n) + b,$$

where the variable of function $f(\cdot)$ is in the range specified in Equation (4b), and o(n) is bounded by the limits specified in Equations (4a) and (4c). The controller signal v(t) becomes $$v(t) = K_c(.)e(t) + D(o(t)) \quad (9)$$

$$= K_c(.)e(t) + 100[a\sum_{j=1}^{N} h_j(n)q_j(n) + b],$$

where n denotes the nth iteration; o(t) is the continuous function of o(n); $D(\cdot)$ is the de-normalization function; and $K_c(\cdot)>0$, the controller gain 41, 42, is a parameter used to adjust the magnitude of the controller. This is the same parameter as in the scaling function $L(\cdot)$ 15, 16 and is useful to fine tune the controller performance or keep the system stable.

An online learning algorithm as described in U.S. Pat. No. 6,556,980 B1 is an example of one algorithm that can be used to continuously update the values of the weighting factors of the MFA controller as follows:

$$\Delta w_{ij}(n)=a^2\eta e(n)E_i(n)h_j(n), \quad (10)$$

$$\Delta h_j(n)=a\eta e(n)q_j(n). \quad (11)$$

The equations (1) through (11) work for both process direct-acting or reverse acting types. Direct-acting means that an increase in the process input will cause its output to increase, and vice versa. Reverse-acting means that an increase in the process input will cause its output to decrease, and vice versa. To keep the above equations working for both direct and reverse acting cases, e(t) is calculated differently based on the acting type of the process as follows:

$$e(t)=r(t)-y(t), \text{ if direct acting} \quad (12a)$$

$$e(t)=-[r(t)-y(t)], \text{ if reverse acting} \quad (12b)$$

This is a general treatment for the process acting types. It applies to all Model-Free Adaptive controllers to be introduced below.

We can consider that there are two single-input-single-output (SISO) MFA controllers 44 and 46 in this design with input signals $e_1(t)$ and $e_2(t)$, and output signals $v_1(t)$ and $v_2(t)$. Then the Combined Output Setter 48 can be used to combine the signals $v_1(t)$ and $v_2(t)$ to produce the controller output u(t).

Figure 3:
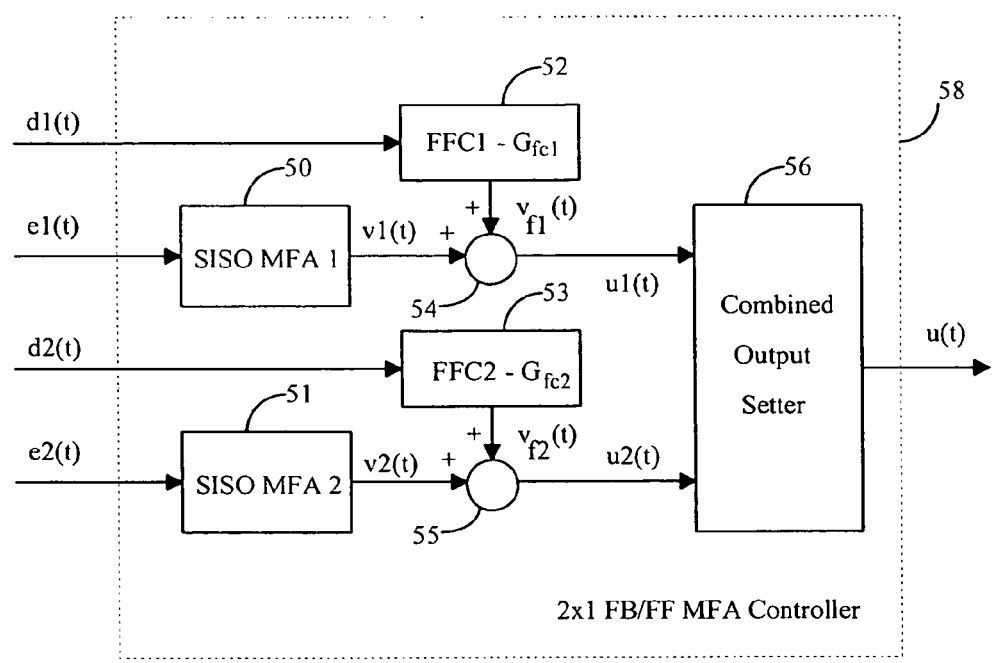
FIG. 3 is a block diagram illustrating the simplified architecture of a 2-input-1-output (2×1) Feedback/Feedforward Model-Free Adaptive (MFA) controller.

FIG. 3 is a block diagram illustrating the simplified architecture of a 2-input-1-output (2×1) Feedback/Feedforward Model-Free Adaptive (MFA) controller. The 2×1 Feedback/Feedforward MFA controller 58 comprises two SISO MFA controllers 50, 51, two Feedforward MFA controllers 52, 53, two signal adders 54, 55, and one Combined Output Setter 56.

The compensation-type Feedforward MFA controller described in the U.S. Pat. No. 6,556,980 B1 is an example of how a Feedforward MFA controller is designed. Due to the adaptive capability of the feedback MFA controller, we can design a Feedforward MFA controller with a first-order dynamic block as follows:

$$G_{fc}(S) = \frac{Y_f(S)}{D(S)} = \frac{K_{sf}K_{cf}}{T_{cf}S + 1}, \quad (13)$$

where D(S) and $Y_f(S)$ are the Laplace transform of signals d(t) and $y_f(t)$, the input and output signals of the Feedforward controller, respectively, $G_{fs}(S)$ is the Laplace transfer function of the Feedforward controller, $K_{cf}$ is the feedforward gain, $T_{cf}$ is the feedforward time constant, and $K_{sf}$ is the feedforward sign factor. We can select the constants $K_{cf}$, $T_{cf}$, and $K_{sf}$ based on the basic understanding of the process. The system can also be fine tuned by adjusting these constants.

The control signals $u_1(t)$ and $u_2(t)$ are calculated based on the following formulas:

$$u_1(t)=v_1(t)+v_{f1}(t), \quad (14a)$$

$$u_2(t)=v_2(t)+v_{f2}(t), \quad (14b)$$

where $v_1(t)$ and $v_2(t)$ are the feedback MFA controller outputs and $v_{f1}(t)$ and $v_{f2}(t)$ are the Feedforward MFA controller outputs. There may be cases where there is only one active feedforward controller. If FFC1 is inactive, $v_{f1}(t)=0$ and then $u_1(t)=v_1(t)$. If FFC2 is inactive, $v_{f2}(t)=0$ and then $u_2(t)=v_2(t)$.

Figure 4:
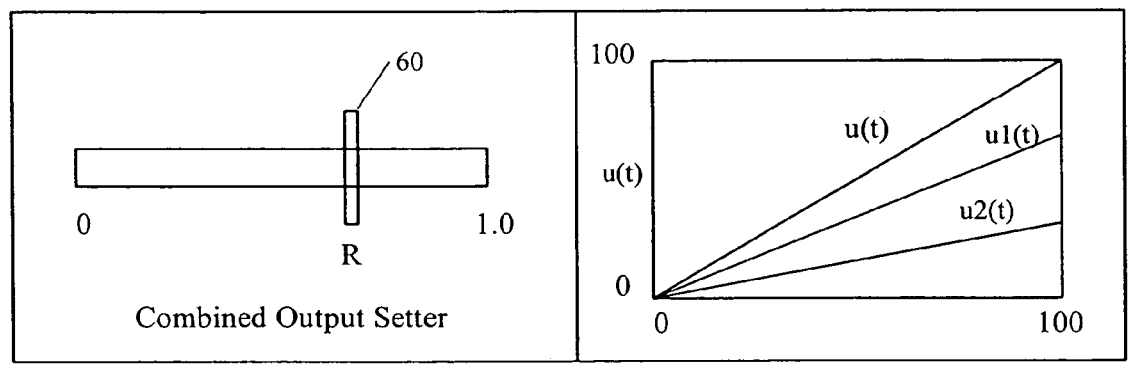
FIG. 4 is a drawing illustrating a mechanism of a Combined Output Setter that combines 2 controller outputs into one controller output.

FIG. 4 is a drawing illustrating a mechanism of a Combined Output Setter that can combine 2 controller outputs $u_1(t)$ and $u_2(t)$ into one controller output u(t). By moving the knob R 60, we can adjust the amount of control signals $u_1(t)$ and $u_2(t)$ to be contributed to the actual controller output u(t), which can be calculated based on the following formula:

$$u(t)=Ru_1(t)+(1-R)u_2(t), \quad (15)$$

where $0 \leq u(t) \leq 100$; $0 \leq R \leq 1$; and R is a constant.

Here we introduce an alternative mechanism for the Combined Output Setter based on the controller gains. The formula to combine multiple controller outputs into one output using controller gains follows:

$$u(t) = \frac{K_{c1}}{K_{c1} + K_{c2}} u_1(t) + \frac{K_{c2}}{K_{c1} + K_{c2}} u_2(t), \quad (16)$$

where $K_{c1}$, and $K_{c2}$ are MFA controller gains for SISO MFA 1 and SISO MFA 2, respectively. This allows the 2×1 MFA controller to dynamically tighten the more important loop of the two. We can easily set a higher controller gain for the more important loop to minimize its error as the highest priority and allow the other loop to be relatively in loose control. On the other hand, we can also easily set both controller gains at an equal value so that both loops are treated with equal importance.

Both mechanisms represented in Equations (15) and (16) can be used as the Combined Output Setter 48 and 56 in FIG. 2 and FIG. 3, respectively.

To expand the design, we can rescale the control output signal u(t) from its 0% to 100% range to an engineering value range by using a linear function. In addition, control limits and constraints can be applied to these signals for safety or other reasons to limit the control actions. These design concepts can be readily applied to all the controllers presented in this patent.

B. 3-Input-1-Output Model-Free Adaptive Controller

Figure 5:
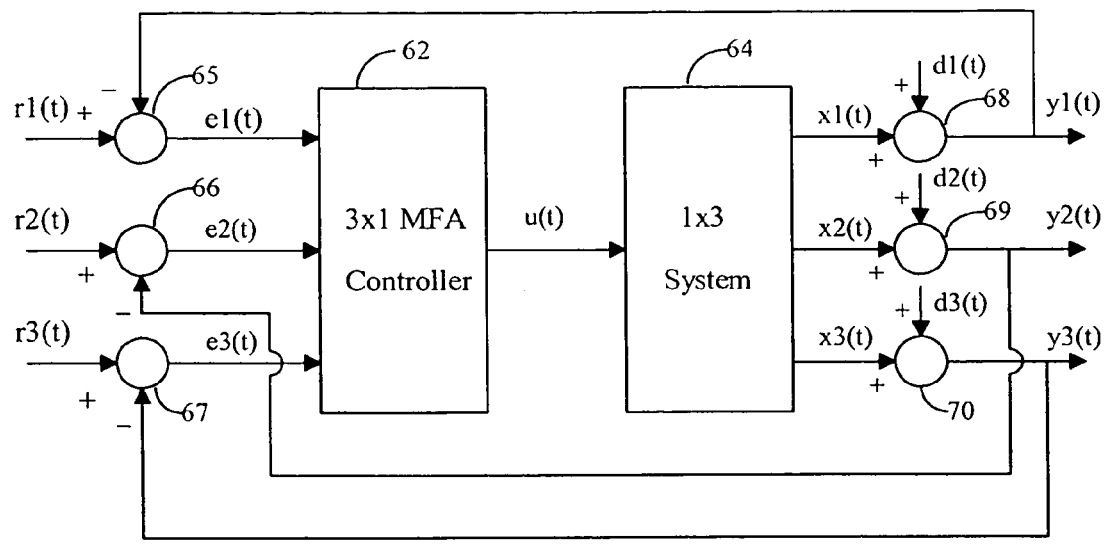
FIG. 5 is a block diagram illustrating a 3-input-1-output (3×1) Model-Free Adaptive (MFA) controller that controls a 1-input-3-output (1×3) system.

FIG. 5 illustrates a 3-input-1-output (3×1) MFA controller that controls a 1-input-3-output (1×3) system. The control system comprises a 3-input-1-output (3×1) MFA controller 62, a 1-input-3-output (1×3) system 64, and signal adders 65, 66, 67, 68, 69, and 70. The signals shown in FIG. 5 are as follows:

$r_1(t)$, $r_2(t)$, $r_3(t)$—Setpoint 1, 2 and 3.

$x_1(t)$, $x_2(t)$, $x_3(t)$—System outputs of the 1×3 system.

$d_1(t)$, $d_2(t)$, $d_3(t)$—Disturbance 1, 2, and 3 caused by noise or load changes.

$y_1(t)$, $y_2(t)$, $y_3(t)$—Measured process variables of the 1×3 system, $y_1(t)=x_1(t)+d_1(t); y_2(t)=x_2(t)+d_2(t);$ and $y_3(t)=x_3(t)+d_3(t).$ $e_1(t)$, $e_2(t)$, $e_3(t)$—Error between the setpoint and measured process variable, $e_1(t)=r_1(t)-y_1(t); e_2(t)=r_2(t)-y_2(t);$ and $e_3(t)=r_3(t)-y_3(t).$ u(t)—Output of the 3×1 MFA Controller.

The control objective is for the controller to produce output u(t) to manipulate the manipulated variable so that the measured process variables $y_1(t)$, $y_2(t)$, and $y_3(t)$ track the given trajectory of their setpoints $r_1(t)$, $r_2(t)$, and $r_3(t)$, respectively, under variations of setpoint, disturbance, and process dynamics. In other words, the task of the MFA controller is to minimize the error $e_1(t)$, $e_2(t)$, and $e_3(t)$ in an online fashion.

Since there is only one manipulated variable, minimizing errors for all three loops may not be possible. The control objective then can be defined as (i) to minimize the error for the most critical loop, or (ii) minimize the error for all 3 loops with no weighting on the importance so that there may be static errors in all loops.

Figure 6:
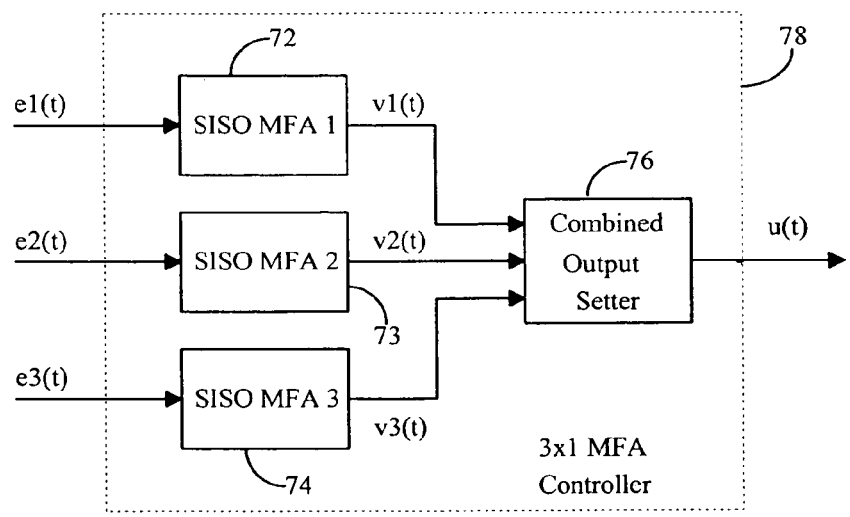
FIG. 6 is a block diagram illustrating the simplified architecture of a 3-input-1-output (3×1) Model-Free Adaptive (MFA) controller.

FIG. 6 illustrates the simplified architecture of a 3-input-1-output Model-Free Adaptive (MFA) controller 78. It includes 3 SISO MFA controllers 72, 73, and 74, and a Combined Output Setter 76. Each of the SISO MFA controllers can be the same as described in the 2×1 MFA controller case. The controller output signals $v_1(t)$, $v_2(t)$, and $v_3(t)$ are used as inputs to the Combined Output Setter 76 to produce the controller output u(t).

Figure 7:
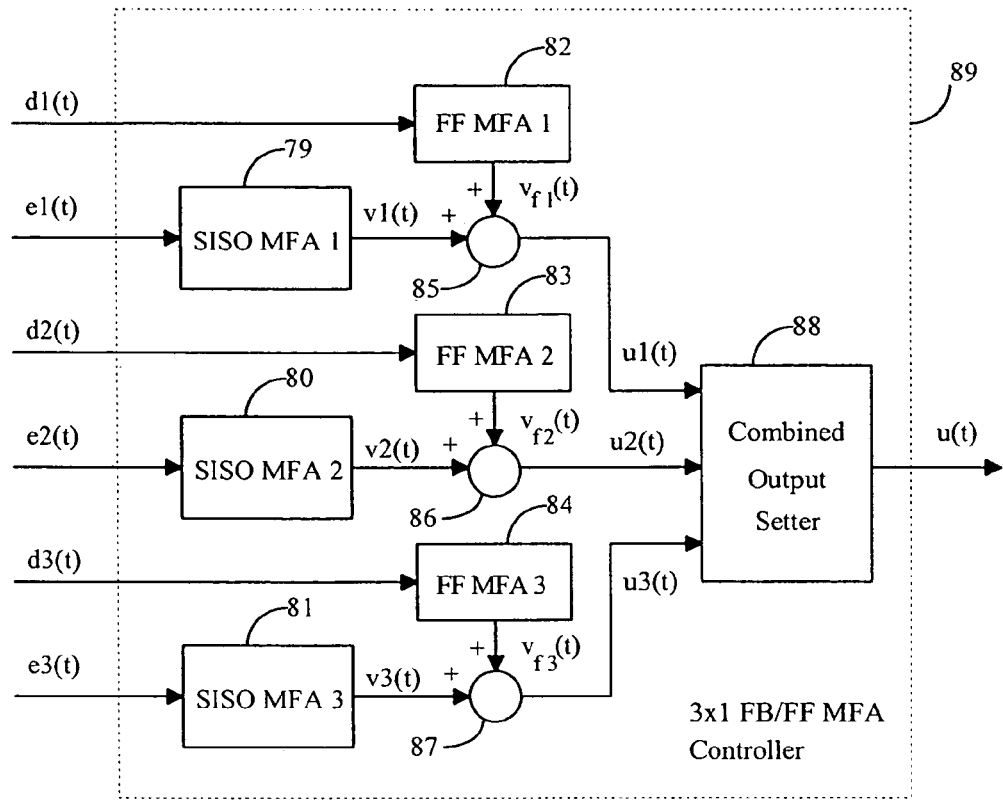
FIG. 7 is a block diagram illustrating the simplified architecture of a 3-input-1-output (3×1) Feedback/Feedforward Model-Free Adaptive (MFA) controller.

FIG. 7 is a block diagram illustrating the simplified architecture of a 3-input-1-output (3×1) Feedback/Feedforward Model-Free Adaptive (MFA) controller. The 3×1 Feedback/Feedforward MFA controller 89 comprises three SISO MFA controllers 79, 80, 81, three Feedforward MFA controllers 82, 83, 84, three signal adders 85, 86, 87, and one Combined Output Setter 88. The design of the Feedforward MFA controllers can be the same as described in the 2×1 Feedback/Feedforward MFA controller case.

The control signals $u_1(t)$, $u_2(t)$, and $u_3(t)$ are calculated based on the following formulas:

$$u_1(t)=v_1(t)+v_{f1}(t), \quad (17a)$$

$$u_2(t)=v_2(t)+v_{f2}(t), \quad (17b)$$

$$u_3(t)=v_3(t)+v_{f3}(t) \quad (17c)$$

where $v_1(t)$, $v_2(t)$, and $v_3(t)$ are the feedback MFA controller outputs and $v_{f1}(t)$, $v_{f2}(t)$, and $v_{f3}(t)$ are the Feedforward MFA controller outputs. If a Feedforward MFA controller is not active, its $v_{fj}(t)=0$, then $u_j(t)=v_j(t)$, j=1, 2, 3.

Figure 8:
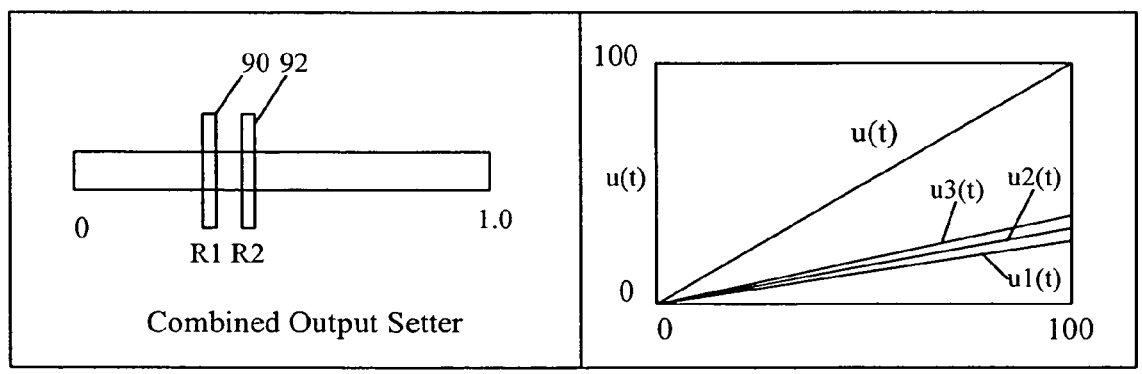
FIG. 8 is a drawing illustrating a mechanism of a Combined Output Setter that combines 3 controller outputs into one controller output.

FIG. 8 is a drawing illustrating a mechanism of a Combined Output Setter that can combine 3 controller outputs $u_1(t)$, $u_2(t)$, and $u_3(t)$ into one controller output u(t). By moving the knobs $R_1$ and $R_2$, we can adjust the amount of control signals $u_1(t)$, $u_2(t)$, and $u_3(t)$ to be contributed to the actual controller output u(t), which can be calculated based on the following formula:

$$u(t)=R_1 u_1(t)+R_2 u_2(t)+(1-R_1-R_2)u_3(t), \quad (18)$$

where $0 \leq u(t) \leq 100$; $0 \leq R_1 \leq 1$; $0 \leq R_2 \leq 1$; $0 \leq R_1+R_2 \leq 1$; and $R_1$ and $R_2$ are constants.

Similar to the 2×1 case, the controller gain weighted Combined Output Setter algorithm is given in the following formula:

$$u(t) = \frac{K_{c1}}{K_{sum}} u_1(t) + \frac{K_{c2}}{K_{sum}} u_2(t) + \frac{K_{c3}}{K_{sum}} u_3(t), \quad (19a)$$

$$K_{sum} = K_{c1} + K_{c2} + K_{c3}, \quad (19b)$$

where $K_{c1}$, $K_{c2}$ and $K_{c3}$ are MFA controller gains for SISO MFA 1, 2, and 3, respectively. This allows the 3×1 MFA controller to dynamically tighten the most important loop of the three. We can easily set a higher controller gain for the most important loop to minimize its error and allow the other loops to be relatively in loose control. We can also set these 3 controller gains at an equal value so that all loops are treated with equal importance. Both mechanisms represented in Equations (18) and (19) can be used as the Combined Output Setter 76 and 88 in FIG. 6 and FIG. 7, respectively.

C. Single-Input-Multi-Output Model-Free Adaptive Controller

Figure 9:
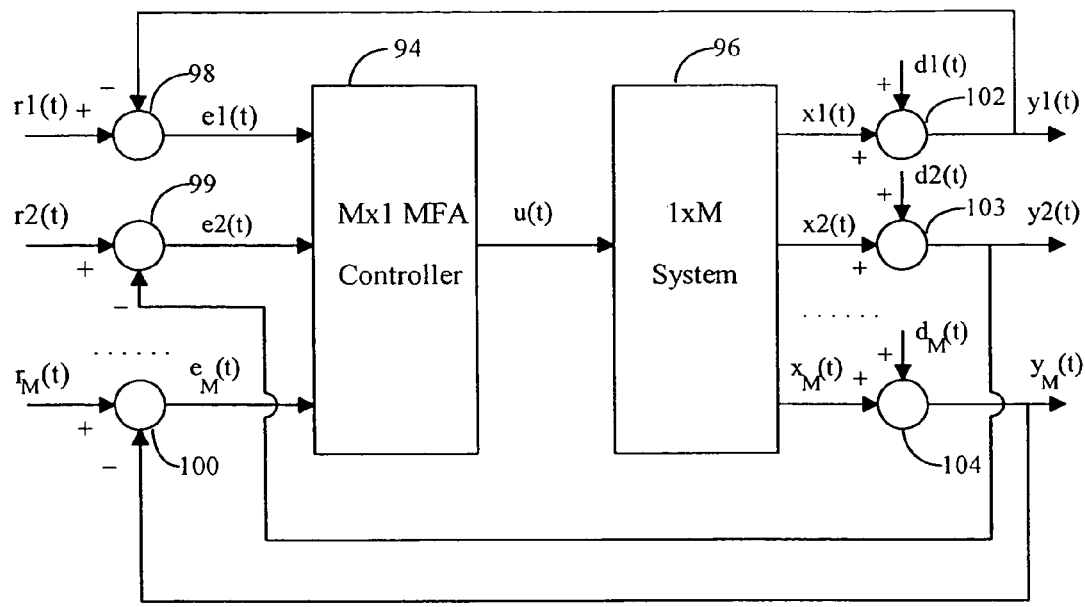
FIG. 9 is a block diagram illustrating an M-input-1-output (M×1) Model-Free Adaptive (MFA) controller that controls a 1-input-M-output (1×M) system.

FIG. 9 illustrates an M-input-1-output (M×1) MFA controller that controls a 1-input-M-output (1×M) system. The control system comprises an M-input-1-output (M×1) MFA controller 94, a 1-input-M-output (1×M) system 96, and signal adders 98, 99, 100, 102, 103, and 104. The signals shown in FIG. 9 are as follows:

$r_1(t), r_2(t), \ldots, r_M(t)$—Setpoint 1, 2, ..., M.

$x_1(t), x_2(t), \ldots, x_M(t)$—System outputs of the 1×M system.

$d_1(t), d_2(t), \ldots, d_M(t)$—Disturbance 1, 2, ..., M caused by noise or load changes.

$y_1(t), y_2(t), \ldots, y_M(t)$—Measured process variables of the 1×M system, $$y_1(t)=x_1(t)+d_1(t); y_2(t)=x_2(t)+d_2(t); \ldots; \text{ and } y_M(t)=x_M(t)+d_M(t).$$

$e_1(t), e_2(t), \ldots, e_M(t)$—Error between the setpoint and measured process variable, $$e_1(t)=r_1(t)-y_1(t); e_2(t)=r_2(t)-y_2(t); \ldots; \text{ and } e_M(t)=r_M(t)-y_M(t).$$

u(t)—Output of the M×1 MFA Controller.

The control objective is for the controller to produce output u(t) to manipulate the manipulated variable so that the measured process variables $y_1(t), y_2(t), \ldots, y_M(t)$ track the given trajectory of their setpoints $r_1(t), r_2(t), \ldots, r_M(t)$, respectively, under variations of setpoint, disturbance, and process dynamics. In other words, the task of the MFA controller is to minimize the error $e_1(t), e_2(t), \ldots, e_M(t)$ in an online fashion.

Since there is only one manipulated variable, minimizing errors for all M loops may not be possible. The control objective then can be defined as (i) to minimize the error for the most critical loop, or (ii) to minimize the error for all M loops with no weighting on the importance so that there may be static errors in all loops.

Figure 10:
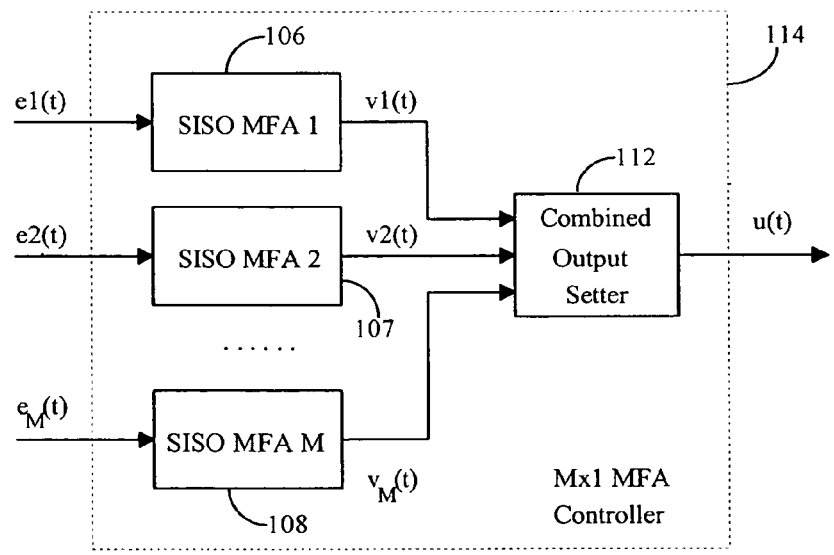
FIG. 10 is a block diagram illustrating the simplified architecture of an M-input-1-output (M×1) Model-Free Adaptive (MFA) controller.

FIG. 10 illustrates the simplified architecture of an M-input-1-output Model-Free Adaptive (MFA) controller 114. It includes M SISO MFA controllers 106, 107, 108 and a Combined Output Setter 112. Each of the SISO MFA controllers can be the same as described in the 2×1 MFA controller case. The controller output signals $v_1(t), v_2(t), \ldots, v_M(t)$ are used as inputs to the Combined Output Setter 112 to produce the controller output u(t).

Figure 11:
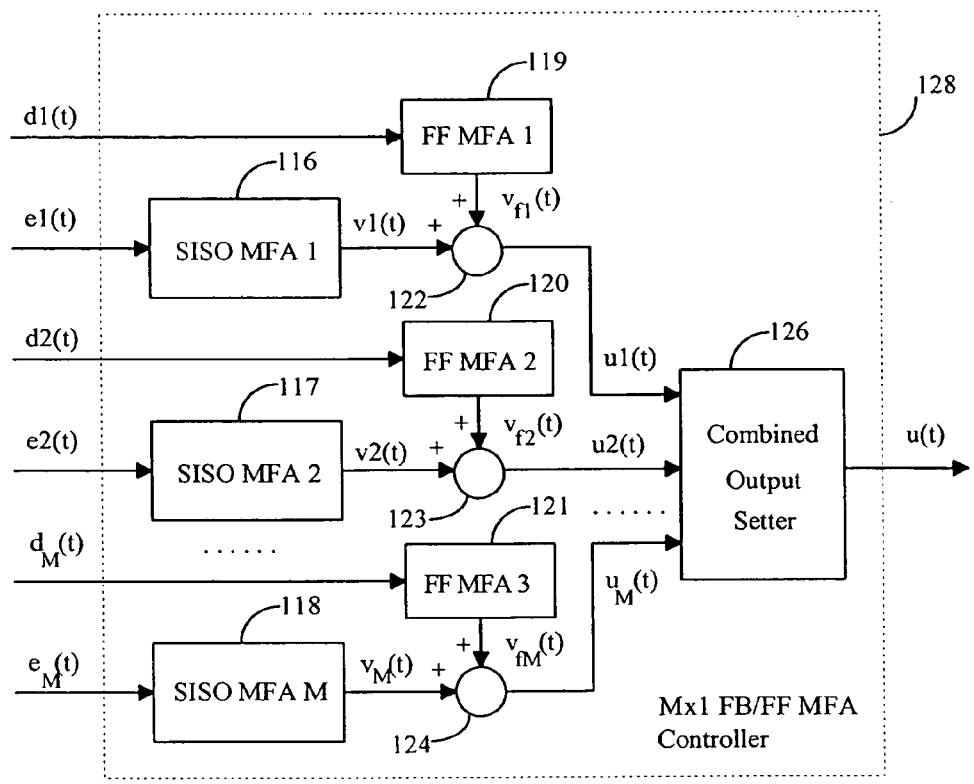
FIG. 11 is a block diagram illustrating the simplified architecture of an M-input-1-output (M×1) Feedback/Feedforward Model-Free Adaptive (MFA) controller.

FIG. 11 is a block diagram illustrating the simplified architecture of an M-input-1-output (M×1) Feedback/Feedforward Model-Free Adaptive (MFA) controller. The M×1 Feedback/Feedforward MFA controller 128 comprises M SISO MFA controllers 116, 117, 118, M Feedforward MFA controllers 119, 120, 121, M signal adders 122, 123, 124, and one Combined Output Setter 126. The design of the Feedforward MFA controllers can be the same as described in the 2×1 Feedback/Feedforward MFA controller case.

The control signals $u_1(t), u_2(t), \ldots, u_M(t)$ are calculated based on the following formulas:

$$u_1(t)=v_1(t)+v_{f1}(t), \quad (20a)$$

$$u_2(t)=v_2(t)+v_{f2}(t) \quad (20b)$$

$$u_M(t)=v_M(t)+v_{fM}(t), \quad (20c)$$

where $v_1(t), v_2(t), \ldots, v_M(t)$ are the feedback MFA controller outputs and $v_{f1}(t), v_{f2}(t), \ldots, v_{fM}(t)$ are the feedforward MFA controller outputs. If a Feedforward MFA controller is not active, its $v_{fj}(t)=0$, then $u_j(t)=v_j(t)$, j=1, 2, ..., M.

Figure 12:
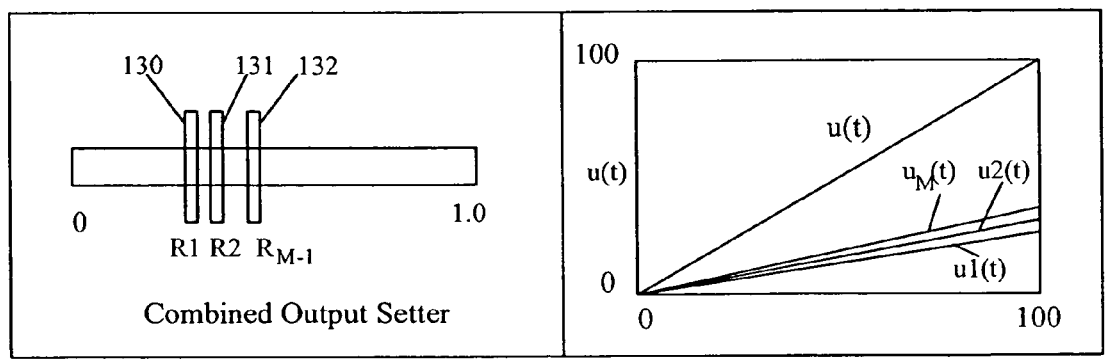
FIG. 12 is a drawing illustrating a mechanism of a Combined Output Setter that combines M controller outputs into one controller output.

FIG. 12 is a drawing illustrating a mechanism of a Combined Output Setter that can combine M controller outputs $u_1(t), u_2(t), \ldots, u_M(t)$ into one controller output u(t). By moving the knobs $R_1, R_2, \ldots, R_{M-1}$, we can adjust the amount of control signals $u_1(t), u_2(t), \ldots, u_M(t)$ to be contributed to the actual controller output u(t), which can be calculated based on the following formula:

$$u(t)=R_1u_1(t)+R_2u_2(t)+ \ldots +(1-R_1-\ldots -R_{M-1})u_M(t), \quad (21)$$

where M=3, 4, 5, ...; $0 \leq u(t) \leq 100$; $0 \leq R_1 \leq 1$; $0 \leq R_2 \leq 1$; ...; $0 \leq R_{M-1} \leq 1$; $0 \leq R_1+R_2+ \ldots +R_{M-1} \leq 1$; and $R_1, R_2, \ldots, R_{M-1}$ are constants.

Similarly, a controller gain weighted Combined Output Setter algorithm is given in the following formula:

$$u(t) = \frac{K_{c1}}{K_{sum}}u_1(t) + \frac{K_{c2}}{K_{sum}}u_2(t) + \ldots + \frac{K_{cM}}{K_{sum}}u_M(t), \quad (22a)$$

$$K_{sum} = K_{c1} + K_{c2} + \ldots + K_{cM}, \quad (22b)$$

where $K_{c1}, K_{c2}, \ldots, K_{cM}$ are MFA controller gains for SISO MFA 1, 2, and M, respectively. This allows the M×1 MFA controller to dynamically tighten the most important loop. We can easily set a higher controller gain for the most important loop to minimize its error as the highest priority and allow the other loops to be relatively in loose control. We can also set these M controller gains at an equal value so that all loops are treated with equal importance.

Both mechanisms represented in Equations (21) and (22) can be used as the Combined Output Setter 112 and 126 in FIG. 10 and FIG. 11, respectively.

To expand the design, we can rescale the control output signal u(t) from its 0% to 100% range to an engineering value range by using a linear function. In addition, control limits and constraints can be applied to these signals for safety or other reasons to limit the control actions.

D. 2-Input-1-Output PID Controller

Figure 13:
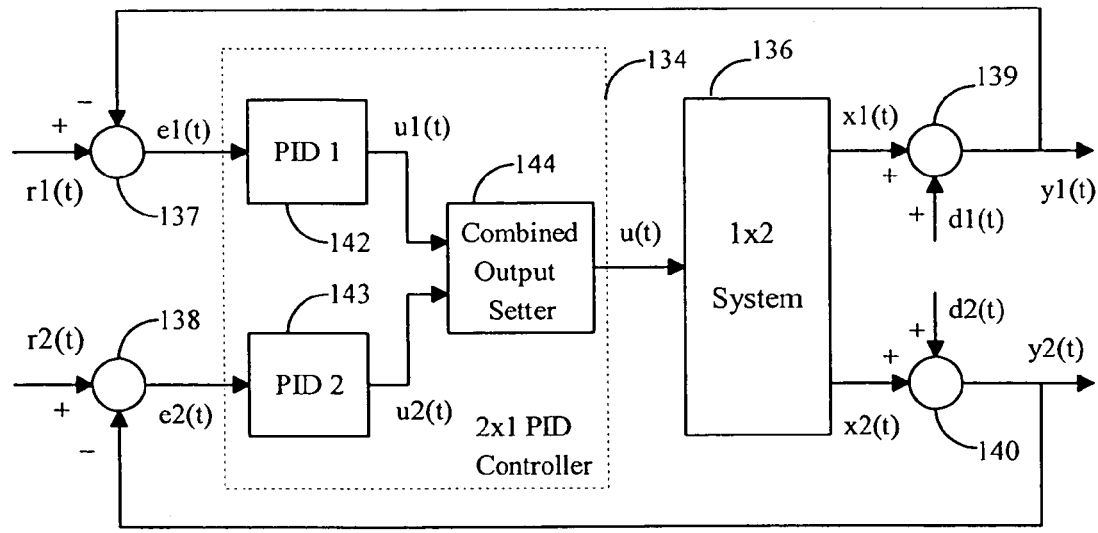
FIG. 13 is a block diagram illustrating a 2-input-1-output (2×1) proportional-integral-derivative (PID) controller that controls a 1-input-2-output (1×2) system.

FIG. 13 illustrates a 2-input-1-output (2×1) PID controller that controls a 1-input-2-output (1×2) system. The control system comprises a 2-input-1-output (2×1) PID controller 134, a 1-input-2-output (1×2) system 136, and signal adders 137, 138, 139, and 140. Within the 2×1 PID controller 134, there are two SISO PID controllers 142, 143 and one Combined Output Setter 144. The signals shown in FIG. 13 are as follows:

$r_1(t), r_2(t)$—Setpoint 1 and Setpoint 2.

$x_1(t), x_2(t)$—System outputs of the 1×2 system.

$d_1(t), d_2(t)$—Disturbance 1 and 2 that are caused by noise or load changes.

$y_1(t), y_2(t)$—Measured process variables of the 1×2 system, $$y_1(t)=x_1(t)+d_1(t); \text{ and } y_2(t)=x_2(t)+d_2(t).$$

$e_1(t), e_2(t)$—Error between the setpoint and measured process variable, $$e_1(t)=r_1(t)-y_1(t); \text{ and } e_2(t)=r_2(t)-y_2(t).$$

u(t)—Output of the 2×1 PID Controller.

$u_1(t), u_2(t)$—Output of SISO PID 1 and PID 2.

The control objective is for the controller to produce output u(t) to manipulate the manipulated variable so that the measured process variables $y_1(t)$ and $y_2(t)$ track the given trajectory of their setpoints $r_1(t)$ and $r_2(t)$, respectively. In other words, the task of the 2×1 PID controller is to minimize the error $e_1(t)$ and $e_2(t)$ in an online fashion.

Since there is only one manipulated variable, minimizing errors for both loops may not be possible. The control objective then can be defined as (i) to minimize the error for the more critical loop of the two, or (ii) to minimize the error for both loops with no weighting on the importance so that there may be static errors in both loops.

The standard PID algorithm has the following form:

$$u_j(t) = K_p \left\{ e(t) + \frac{1}{T_i} \int e(t) dt + T_d \frac{de(t)}{dt} \right\}, \quad (23)$$

where $K_p$ is the Proportional Gain, $T_i$ is the Integral Time in second/repeat, $T_d$ is the Derivative Time in repeat/second, and $u_j(t)$ is the output of the jth PID, j=1, 2.

The Combined Output Setter illustrated in FIG. 4 can be used to combine the two SISO PID controller outputs $u_1(t)$ and $u_2(t)$ into one controller output u(t). By moving the knob R, we can adjust the amount of control signals $u_1(t)$ and $u_2(t)$ to be contributed to the actual controller output u(t), which can be calculated based on the following formula:

$$u(t) = R u_1(t) + (1-R) u_2(t), \quad (24)$$

where $0 \leq u(t) \leq 100$; $0 \leq R \leq 1$; and R is a constant.

A controller gain weighted Combined Output Setter algorithm is given in the following formula:

$$u(t) = \frac{K_{p1}}{K_{p1} + K_{p2}} u_1(t) + \frac{K_{p2}}{K_{p1} + K_{p2}} u_2(t), \quad (25)$$

where $K_{p1}$ and $K_{p2}$ are proportional gains for PID 1 and PID 2, respectively. This allows the 2×1 PID controller to dynamically tighten the more important loop of the two. We can easily set a higher proportional gain for the more important loop to minimize its error as the highest priority and allow the other loop to be relatively in loose control. We can also easily set both controller gains at an equal value so that both loops are treated with equal importance.

Both mechanisms represented in Equations (24) and (25) can be used as the Combined Output Setter 144 in FIG. 13.

To expand the design, we can rescale the control output signal u(t) from its 0% to 100% range to an engineering value range by using a linear function. In addition, control limits and constraints can be applied to these signals for safety or other reasons to limit the control actions.

Since PID is not an adaptive controller, proper manual tuning of its parameters $K_p$, $T_i$, and $T_d$ is required. When process dynamics change, frequent manual tuning of the parameters may be required. Model-Free Adaptive (MFA) controllers will outperform the PIDs because of their adaptive capability.

E. Multi-Input-Single-Output PID Controller

Figure 14:
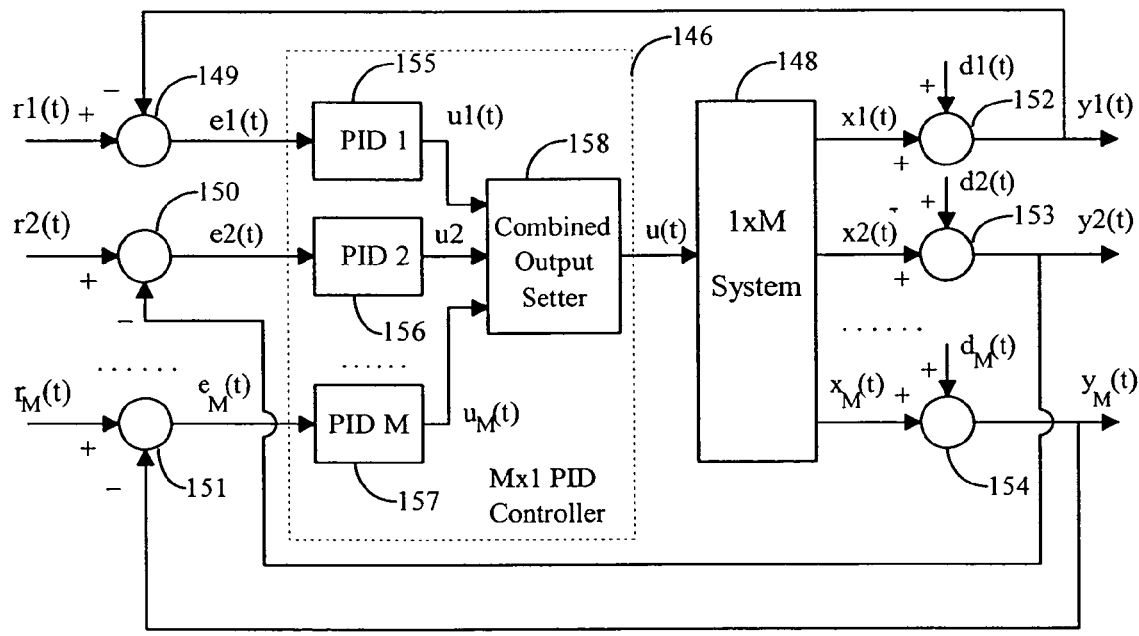
FIG. 14 is a block diagram illustrating an M-input-1-output (M×1) proportional-integral-derivative (PID) controller that controls a 1-input-M-output (1×M) system.

FIG. 14 illustrates an M-input-1-output (M×1) PID controller that controls a 1-input-M-output (1×M) system. The control system comprises an M-input-1-output (M×1) PID controller 146, a 1-input-M-output (1×M) system 148, and signal adders 149, 150, 151, 152, 153, and 154. Within the M×1 PID controller 146, there are M SISO PID controllers 155, 156, 157 and one Combined Output Setter 158. The signals shown in FIG. 14 are as follows:

$r_1(t), r_2(t), \ldots, r_M(t)$—Setpoint 1, 2, ..., M.

$x_1(t), x_2(t), \ldots, X_M(t)$—System outputs of the 1×M system.

$d_1(t), d_2(t), \ldots, d_M(t)$—Disturbance 1, 2, ..., M caused by noise or load changes.

$y_1(t), y_2(t), \ldots, y_M(t)$—Measured process variables of the 1×M system, $y_1(t) = x_1(t) + d_1(t); y_2(t) = x_2(t) + d_2(t); \ldots;$ and $y_M(t) = x_M(t) + d_M(t)$.

$e_1(t), e_2(t), \ldots, e_M(t)$—Error between the setpoint and measured process variable, $e_1(t) = r_1(t) - y_1(t); e_2(t) = r_2(t) - y_2(t); \ldots;$ and $e_M(t) = r_M(t) - y_M(t)$.

u(t)—Output of the M×1 PID Controller.

$u_1(t), u_2(t), \ldots, u_M(t)$—Output of SISO PID 1, 2, ..., M, respectively.

The control objective is for the controller to produce output u(t) to manipulate the manipulated variable so that the measured process variables $y_1(t), y_2(t), \ldots, y_M(t)$ track the given trajectory of their setpoints $r_1(t), r_2(t), \ldots, r_M(t)$, respectively. In other words, the task of the PID controller is to minimize the error $e_1(t), e_2(t), \ldots, e_M(t)$ in an online fashion.

Since there is only one manipulated variable, minimizing errors for all M loops may not be possible. The control objective then can be defined as (i) to minimize the error for the most critical loop, or (ii) to minimize the error for all M loops with no weighting on the importance so that there may be static errors in all loops.

The standard PID algorithm has the following form:

$$u_j(t) = K_p \left\{ e(t) + \frac{1}{T_i} \int e(t) dt + T_d \frac{de(t)}{dt} \right\}, \quad (26)$$

where $K_p$ is the Proportional Gain, $T_i$ is the Integral Time in second/repeat, $T_d$ is the Derivative Time in repeat/second, and $u_j(t)$ is the output of the jth PID, j=1, 2, ... M.

Similarly, we can expand the 2×1 case to the M×1 case. The Combined Output Setter illustrated in FIG. 12 can be used to combine M PID controller outputs $u_1(t), u_2(t), \ldots, u_M(t)$ into one controller output u(t). By moving the knobs $R_1, R_2, \ldots, R_{M-1}$, we can adjust the amount of control signals $u_1(t), u_2(t), \ldots, u_M(t)$ to be contributed to the actual controller output u(t), which can be calculated based on the following formula:

$$u(t) = R_1 u_1(t) + R_2 u_2(t) + \ldots + (1 - R_1 - \ldots - R_{M-1}) u_M(t), \quad (27)$$

where M=3, 4, 5, ..., $0 \leq u(t) \leq 100$; $0 \leq R_1 \leq 1$; $0 \leq R_2 \leq 1$; ...; $0 \leq R_{M-1} \leq 1$; $0 \leq R_1 + R_2 + \ldots + R_{M-1} \leq 1$; and $R_1, R_2, \ldots, R_{M-1}$, are constants.

Similarly, a controller gain weighted Combined Output Setter algorithm is given in the following formula:

$$u(t) = \frac{K_{p1}}{K_{sum}} u_1(t) + \frac{K_{p2}}{K_{sum}} u_2(t) + \ldots + \frac{K_{pM}}{K_{sum}} u_M(t), \quad (28a)$$

$$K_{sum} = K_{p1} + K_{p2} + \ldots + K_{pM}, \quad (28b)$$

where $K_{p1}, K_{p2}, \ldots, K_{pM}$ are proportional gains for PID 1, 2, ..., M, respectively. This allows the M×1 PID controller to dynamically tighten the most important loop. We can easily set a higher proportional gain for the most important loop to minimize its error as the highest priority and allow the other loops to be relatively in loose control. We can also set these M proportional gains at an equal value so that all loops are treated with equal importance. Both mechanisms represented in Equations (27) and (28) can be used as the Combined Output Setter 158 in FIG. 14.

Since PID is a general-purpose controller, the 2×1 and M×1 PID controllers presented in this patent apply to all alternative forms of PID algorithms. They may be P only, PI, PD, or PID controllers, in analog or digital formulas, with various definitions of variables, parameters and units, etc. This M×1 PID controller with the Combined Output Setter will be more powerful than a single-input-single-output PID controller when controlling a 1×M system. However, since it is not an adaptive controller, it may not be able to handle large dynamic changes in the systems. Proper manual tuning of PID parameters is always required. The M×1 Model-Free Adaptive (MFA) controller presented in this patent is a more preferred solution for controlling a 1×M system.

F. Multi-Input-Single-Output Controller

Figure 15:
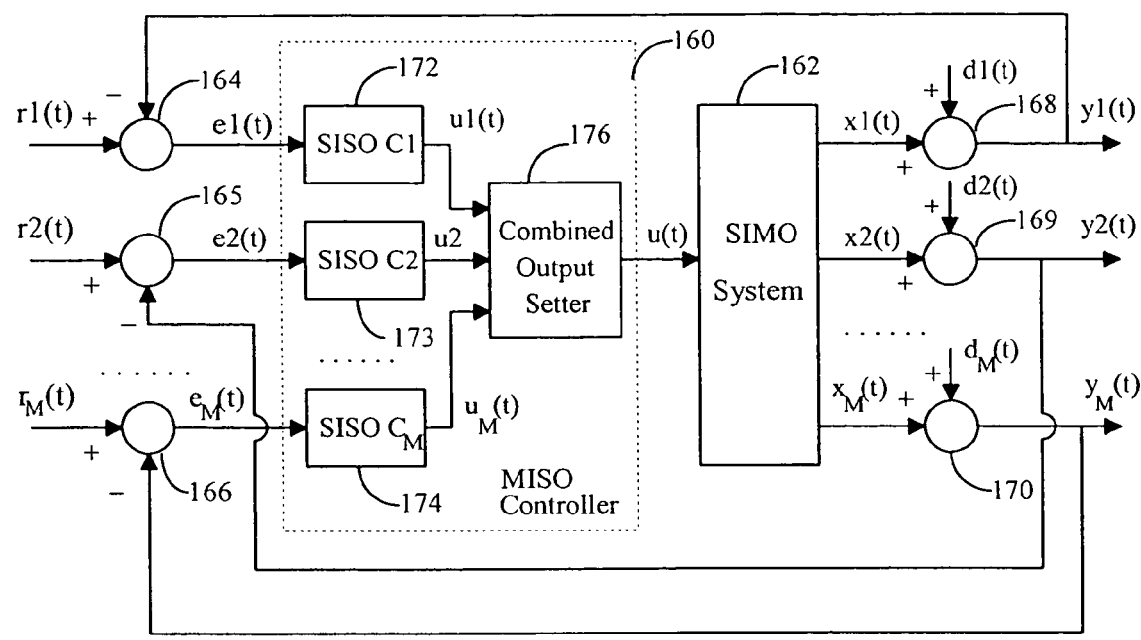
FIG. 15 is a block diagram illustrating a multi-input-single-output (MISO) controller that controls a single-input-multi-output (SIMO) system.

FIG. 15 illustrates a multi-input-single-output (MISO) controller that controls a single-input-multi-output (SIMO) system. The control system comprises a multi-input-single-output (MISO) controller 160, a single-input-multi-output (SIMO) system 162, and signal adders 164, 165, 166, 168, 169, and 170. Within the MISO controller 160, there are M single-input-single-output (SISO) controllers 172, 173, 174 and one Combined Output Setter 176. The signals shown in FIG. 15 are as follows:

$r_1(t), r_2(t), \ldots, r_M(t)$—Setpoint 1, 2, ..., M.

$x_1(t), x_2(t), \ldots, x_M(t)$—System outputs of the SIMO system.

$d_1(t), d_2(t), \ldots, d_M(t)$—Disturbance 1, 2, ..., M caused by noise or load changes.

$y_1(t), y_2(t), \ldots, y_M(t)$—Measured process variables of the SIMO system, $$y_1(t)=x_1(t)+d_1(t); y_2(t)=x_2(t)+d_2(t); \ldots; \text{and } y_M(t)=x_M(t)+d_M(t).$$

$e_1(t), e_2(t), \ldots, e_M(t)$—Error between the setpoint and measured process variable, $$e_1(t)=r_1(t)-y_1(t); e_2(t)=r_2(t)-y_2(t); \ldots; \text{and } e_M(t)=r_M(t)-y_M(t).$$

u(t)—Output of the MISO Controller.

$u_1(t), u_2(t), \ldots, u_M(t)$—Output of SISO controller $C_1$, $C_2, \ldots, C_M$.

The control objective is for the controller to produce output u(t) to manipulate the manipulated variable so that the measured process variables $y_1(t), y_2(t), \ldots, y_M(t)$ track the given trajectory of their setpoints $r_1(t), r_2(t), \ldots, r_M(t)$, respectively. In other words, the task of the MISO controller is to minimize errors $e_1(t), e_2(t), \ldots, e_M(t)$ in an online fashion.

Since there is only one manipulated variable, minimizing errors for all M loops may not be—possible. The control objective then can be defined as (i) to minimize the error for the most critical loop, or (ii) to minimize the error for all M loops with no weighting on the importance so that there may be static errors in all loops.

The MISO controller comprises M single-input-single-output (SISO) controllers 172, 173, 174. Without losing generality, we assume the control outputs for the SISO controllers $C_1, C_2, \ldots, C_M$ are calculated based on the following formulas, respectively:

$$u_1(t)=f(e_1(t),t, P_{11}, P_{12}, \ldots, P_{1l}) \quad (29a)$$

$$u_2(t)=f(e_2(t),t, P_{21}, P_{22}, \ldots, P_{2l}) \quad (29b)$$

$$u_M(t)=f(e_M(t),t, P_{M1}, P_{M2}, \ldots, P_{Ml}), \quad (29c)$$

where t is time, $P_{11}, P_{12}, \ldots, P_{1l}$ are tuning parameters for controller $C_1$, $P_{21}, P_{22}, \ldots, P_{2l}$ are tuning parameters for controller $C_2, \ldots,$ and $P_{M1}, P_{M2}, \ldots, P_{Ml}$ are tuning parameters for controller $C_M$.

The Combined Output Setter illustrated in FIG. 12 can be used to combine M SISO controller outputs $u_1(t), u_2(t), \ldots, u_M(t)$ into one controller output u(t). By moving the knobs $R_1, R_2, \ldots, R_{M-1}$, we can adjust the amount of control signals $u_1(t), u_2(t), \ldots, u_M(t)$ to be contributed to the actual controller output u(t), which can be calculated based on the following formula:

$$u(t)=R_1u_1(t)+R_2u_2(t)+ \ldots +(1-R_1- \ldots -R_{M-1})u_M(t), \quad (30)$$

where M=3, 4, 5 ..., $0 \leq u(t) \leq 100$; $0 \leq R_1 \leq 1$; $0 \leq R_2 \leq 1$; ...; $0 \leq R_{M-1} \leq 1$; $0 \leq R_1+R_2+ \ldots +R_{M-1} \leq 1$; and $R_1, R_2, \ldots, R_{M-1}$ are constants.

Similarly, a controller gain weighted Combined Output Setter algorithm is given in the following formula, assuming the controller gain is the first parameter $P_1$:

$$u(t) = \frac{P_{11}}{K_{sum}}u_1(t) + \frac{P_{21}}{K_{sum}}u_2(t) + \ldots + \frac{P_{M1}}{K_{sum}}u_M(t), \quad (31a)$$

$$K_{sum} = P_{11} + P_{21} + \ldots + P_{M1}, \quad (31b)$$

where $P_{11}, P_{21}, \ldots, P_{M1}$ are gains for controller $C_1, C_2, \ldots, C_M$, respectively. This allows the MISO controller to dynamically tighten the most important loop. We can easily set a higher controller gain for the most important loop to minimize its error as the highest priority and allow the other loops to be relatively in loose control. We can also set these M controller gains at an equal value so that all loops are treated with equal importance. Both mechanisms represented in Equations (30) and (31) can be used as the Combined Output Setter 176 in FIG. 15.

This is a general case example of converting M single-input-single-output (SISO) controllers including but not limited to Model-Free Adaptive (MFA) controllers, or proportional-integral-derivative (PID) controllers, or any other form of SISO controllers to a multi-input-single-output (MISO) controller to control a single-input-multi-output (SIMO) system.

The invention claimed is:

1. A multi-input-single-output controller for a process having a plurality of process outputs which are controlled by one controller output applied to one actuator whose output is the input of said process, said controller comprising:
   a) a plurality of neural networks each including:
      i) an error input representative of the difference between a predetermined setpoint and one of said process outputs;
      ii) a normalization unit for normalizing said error input to a predetermined range of values;
      iii) a scaling function for scaling said normalized error input to produce a value $E_1$ of the form $$E_1 = \frac{K_c}{T_c}N(e(t)),$$

or an equivalent thereof, in which $K_c$ is the controller gain; $T_c$ is the user-selected time constant of said process; N(·) is the normalization function of said normalization unit; and e(t) is the value of said error input at any given time;

iv) a layer of input neurons having as their inputs successively time-delayed values of $E_1$;

v) a layer of hidden neurons each having as its output the sum of individually weighted ones of said successively time-delayed values of $E_1$;

vi) an output neuron having as its output the sum of a first function of the individually weighted outputs of said hidden neurons;

vii) a control signal which is at least in part the denormalized value of a second function of the output of said output neuron; and b) said control signals of said plurality of neural networks being combined by a combined output setter to produce said controller output.

2. The controller of claim 1, in which said control signal of each neural network is the sum of said denormalized value and the value $K_c\, e(t)$, or an equivalent thereof.

3. The controller of claim 1, in which the said plurality is 2.

4. The controller of claim 3, in which said controller output is generated by the said combined output setter in the form:

$$u(t)=Rv_1(t)+(1-R)v_2(t)$$

or an equivalent thereof, in which $0 \leq u(t) \leq 100$; $0 \leq R \leq 1$; R is a constant; and $v_1(t)$ and $v_2(t)$ are said control signals of the said neural networks.

5. The controller of claim 3, in which said controller output is generated by the said combined output setter in the form:

$$u(t) = \frac{K_{c1}}{K_{c1}+K_{c2}} v_1(t) + \frac{K_{c2}}{K_{c1}+K_{c2}} v_2(t),$$

or an equivalent thereof, in which $0 \leq u(t) \leq 100$; $K_{c1}$ and $K_{c2}$ are user-selected controller gains for each of the said neural network, respectively; and $v_1(t)$ and $v_2(t)$ are said control signals of the said neural networks.

6. The controller of claim 3, in which there are two additional feedforward controllers and the combined feedback and feedforward controller signals $u_1(t)$ and $u_2(t)$ are of the form $$u_1(t)=v_1(t)+v_{f1}(t)$$
$$u_2(t)=v_2(t)+v_{f2}(t)$$

or an equivalent thereof, in which $v_1(t)$ and $v_2(t)$ are the said control signals of the said neural networks, respectively; and $v_{f1}(t)$ and $v_{f2}(t)$ are the feedforward controller outputs.

7. The controller of claim 6, in which said controller output is generated by the said combined output setter in the form:

$$u(t)=Ru_1(t)+(1-R)u_2(t),$$

or an equivalent thereof, in which $0 \leq u(t) \leq 100$; $0 \leq R \leq 1$; R is a constant; and $u_1(t)$ and $u_2(t)$ are the combined feedback and feedforward controller signals.

8. The controller of claim 6, in which said controller output is generated by the said combined output setter in the form:

$$u(t) = \frac{K_{c1}}{K_{c1}+K_{c2}} u_1(t) + \frac{K_{c2}}{K_{c1}+K_{c2}} u_2(t),$$

or an equivalent thereof, in which $0 \leq u(t) \leq 100$; $K_{c1}$ and $K_{c2}$ are user-selected controller gains for each of the said neural network, respectively; and $u_1(t)$ and $u_2(t)$ are the combined feedback and feedforward controller signals.

9. The controller of claim 1, in which the said plurality is 3.

10. The controller of claim 9, in which said controller output is generated by the said combined output setter in the form:

$$u(t)=R_1v_1(t)+R_2v_2(t)+(1-R_1-R_2)v_3(t),$$

or an equivalent thereof, in which $0 \leq u(t) \leq 100$; $0 \leq R_1 \leq 1$; $0 \leq R_2 \leq 1$; $0 \leq R_1+R_2 \leq 1$; $R_1$ and $R_2$ are constants; and $v_1(t)$, $v_2(t)$, and $v_3(t)$ are said control signals of the said neural networks.

11. The controller of claim 9, in which said controller output is generated by the said combined output setter in the form:

$$u(t) = \frac{K_{c1}}{K_{sum}} v_1(t) + \frac{K_{c2}}{K_{sum}} v_2(t) + \frac{K_{c3}}{K_{sum}} v_3(t),$$

$$K_{sum} = K_{c1}+K_{c2}+K_{c3},$$

or an equivalent thereof, in which $0 \leq u(t) \leq 100$; $K_{c1}$, $K_{c2}$, and $K_{c3}$ are user-selected controller gains for each of the said neural network, respectively; and $v_1(t)$, $v_2(t)$, and $v_3(t)$ are said control signals of the said neural networks.

12. The controller of claim 9, in which there are three additional feedforward controllers and the combined feedback and feedforward controller signals $u_1(t)$, $u_2(t)$ and $u_3(t)$ are of the form $$u_1(t)=v_1(t)+v_{f1}(t)$$
$$u_2(t)=v_2(t)+v_{f2}(t)$$
$$u_3(t)=v_3(t)+v_{f3}(t)$$

or an equivalent thereof, in which $v_1(t)$, $v_2(t)$, and $v_3(t)$ are the said control signals of the said neural networks, respectively; and $v_{f1}(t)$, $v_{f2}(t)$, and $v_{f3}(t)$ are the feedforward controller outputs.

13. The controller of claim 12, in which said controller output is generated by the said combined output setter in the form:

$$u(t)=R_1u_1(t)+R_2u_2(t)+(1-R_1-R_2)u_3(t)$$

or an equivalent thereof, in which $0 \leq u(t) \leq 100$; $0 \leq R_1 \leq 1$; $0 \leq R_2 \leq 1$; $0 \leq R_1+R_2 \leq 1$; $R_1$ and $R_2$ are constants; and $u_1(t)$, $u_2(t)$, and $u_3(t)$ are the combined feedback and feedforward controller signals.

14. The controller of claim 12, in which said controller output is generated by the said combined output setter in the form:

$$u(t) = \frac{K_{c1}}{K_{sum}} u_1(t) + \frac{K_{c2}}{K_{sum}} u_2(t) + \frac{K_{c3}}{K_{sum}} u_3(t),$$

$$K_{sum} = K_{c1}+K_{c2}+K_{c3},$$

or an equivalent thereof, in which $0 \leq u(t) \leq 100$; $K_{c1}$, $K_{c2}$, and $K_{c3}$ are user-selected controller gains for each of the said neural network, respectively; and $u_1(t)$, $u_2(t)$, and $u_3(t)$ are the combined feedback and feedforward controller signals.

15. The controller of claim 1, in which the said plurality is M.

16. The controller of claim 15, in which said controller output is generated by the said combined output setter in the form:

$$u(t)=R_1v_1(t)+R_2v_2(t)+\ldots+(1-R_1-\ldots-R_{M-1})v_M(t),$$

or an equivalent thereof, in which $M=3, 4, 5, \ldots$; $0 \leq u(t) \leq 100$; $0 \leq R_1 \leq 1$; $0 \leq R_2 \leq 1; \ldots; 0 \leq R_{M-1} \leq 1$; $0 \leq R_1+R_2+\ldots+R_{M-1} \leq 1$; $R_1, R_2, \ldots, R_{M-1}$ are constants; and $v_1(t), v_2(t), \ldots, v_M(t)$ are said control signals of the said neural networks.

17. The controller of claim 15, in which said controller output is generated by the said combined output setter in the form:

$$u(t) = \frac{K_{c1}}{K_{sum}}v_1(t) + \frac{K_{c2}}{K_{sum}}v_2(t) + \ldots + \frac{K_{cM}}{K_{sum}}v_M(t),$$

$$K_{sum} = K_{c1} + K_{c2} + \ldots + K_{cM},$$

or an equivalent thereof, in which $M=3, 4, 5, \ldots$; $0 \leq u(t) \leq 100$; $K_{c1}, K_{c2}, \ldots, K_{cM}$ are user-selected controller gains for each of the said neural network, respectively; and $v_1(t), v_2(t), \ldots, v_M(t)$ are said control signals of the said neural networks.

18. The controller of claim 15, in which there are M additional feedforward controllers and the combined feedback and feedforward controller signals $u_1(t), u_2(t), \ldots, u_M(t)$ are of the form $$u_1(t)=v_1(t)+v_{f1}(t)$$

$$u_2(t)=v_2(t)+v_{f2}(t)$$

$$\ldots$$

$$u_M(t)=v_M(t)+v_{fM}(t),$$

or an equivalent thereof, in which $v_1(t), v_2(t), \ldots, v_M(t)$ are the said control signals of the said neural networks, respectively; and $v_{f1}(t), v_{f2}(t), \ldots, v_{fM}(t)$ are the feedforward controller outputs.

19. The controller of claim 18, in which said controller output is generated by the said combined output setter in the form:

$$u(t)=R_1u_1(t)+R_2u_2(t)+\ldots+(1-R_1-\ldots-R_{M-1})u_M(t),$$

or an equivalent thereof, in which $M=3, 4, 5, \ldots$; $0 \leq u(t) \leq 100$; $0 \leq R_1 \leq 1$; $0 \leq R_1 \leq 1$; $0 \leq R_2 \leq 1; \ldots$; $0 \leq R_{M-1} \leq 1$; $0 \leq R_1+R_2+\ldots+R_{M-1} \leq 1$; $R_1, R_2, \ldots, R_{M-1}$ are constants; and $u_1(t), u_2(t), \ldots, u_M(t)$ are the combined feedback and feedforward controller signals.

20. The controller of claim 18, in which said controller output is generated by the said combined output setter in the form:

$$u(t) = \frac{K_{c1}}{K_{sum}}u_1(t) + \frac{K_{c2}}{K_{sum}}u_2(t) + \ldots + \frac{K_{cM}}{K_{sum}}u_M(t),$$

$$K_{sum} = K_{c1} + K_{c2} + \ldots + K_{cM},$$

or an equivalent thereof, in which $M=3, 4, 5, \ldots$; $0 \leq u(t) \leq 100$; $K_{c1}, K_{c2}, \ldots, K_{cM}$ are user-selected controller gains for each of the said neural network, respectively; and $u_1(t), u_2(t), \ldots, u_M(t)$ are the combined feedback and feedforward controller signals.

21. A multi-input-single-output PID controller for a process having a plurality of process outputs which are controlled by one controller output applied to one actuator whose output is the input of said process, said controller comprising:

a) a plurality of PID controllers in the form $$u_j(t) = K_p\left\{e(t) + \frac{1}{T_i}\int e(t)dt + T_d\frac{de(t)}{dt}\right\},$$

or an equivalent thereof, in which $K_p$ is the proportional gain; $T_i$ is the integral time; $T_d$ is the derivative time; and $u_j(t)$ is the output of the jth PID, $j=1, 2, \ldots M$; and b) said control signals of said plurality of PID controllers being combined by a combined output setter to produce said controller output.

22. The controller of claim 21, in which the said plurality is 2.

23. The controller of claim 22, in which said controller output is generated by the said combined output setter in the form:

$$u(t)=Ru_1(t)+(1-R)u_2(t),$$

or an equivalent thereof, in which $0 \leq u(t) \leq 100$; $0 \leq R \leq 1$; R is a constant; and $u_1(t)$ and $u_2(t)$ are the outputs of the said PID controllers.

24. The controller of claim 22, in which said controller output is generated by the said combined output setter in the form:

$$u(t) = \frac{K_{p1}}{K_{p1}+K_{p2}}u_1(t) + \frac{K_{p2}}{K_{p1}+K_{p2}}u_2(t),$$

or an equivalent thereof, in which $0 \leq u(t) \leq 100$; $K_{p1}$ and $K_{p2}$ are user-selected PID controller gains, respectively; and $u_1(t)$ and $u_2(t)$ are the outputs of the said PID controllers.

25. The controller of claim 21, in which the said plurality is M.

26. The controller of claim 25, in which said controller output is generated by the said combined output setter in the form:

$$u(t)=R_1u_1(t)+R_2u_2(t)+\ldots+(1-R-\ldots-R_{M-1})u_M(t),$$

or an equivalent thereof, in which $M=3, 4, 5, \ldots$; $0 \leq u(t) \leq 100$; $0 \leq R_1 \leq 1$; $0 \leq R_2 \leq 1; \ldots$; $0 \leq R_{M-1} \leq 1$; $0 \leq R_1+R_2+\ldots+R_{M-1} \leq 1$; $R_1, R_2, \ldots, R_{M-1}$ are constants; and $u_1(t), u_2(t),$ and $u_M(t)$ are the outputs of the said PID controllers.

27. The controller of claim 25, in which said controller output is generated by the said combined output setter in the form:

$$u(t) = \frac{K_{p1}}{K_{sum}}u_1(t) + \frac{K_{p2}}{K_{sum}}u_2(t) + \ldots + \frac{K_{pM}}{K_{sum}}u_M(t),$$

$$K_{sum} = K_{p1} + K_{p2} + \ldots + K_{pM},$$

or an equivalent thereof, in which $M=3, 4, 5, \ldots$; $0 \leq u(t) \leq 100$; $K_{p1}, K_{p2}, \ldots, K_{pM}$ are user-selected PID controller gains, respectively; and $u_1(t)$, $u_2(t)$, and $u_M(t)$ are the outputs of the said PID controllers.

28. A multi-input-single-output controller for a process having a plurality of process outputs which are controlled by one controller output applied to one actuator whose output is the input of said process, said controller comprising:

a) a plurality of single-input-single-output (SISO) controllers $C_1, C_2, \ldots, C_M$ in the form $$u_1(t) = f(e_1(t), t, P_{11}, P_{12}, \ldots, P_{1l}),$$

$$u_2(t) = f(e_2(t), t, P_{21}, P_{22}, \ldots, P_{2l}),$$

$$\ldots$$

$$u_M(t) = f(e_M(t), t, P_{M1}, P_{M2}, \ldots, P_{Ml}),$$

or an equivalent thereof, in which $M=1, 2, 3, 4, 5 \ldots$; t is time; $P_{11}, P_{12}, \ldots, P_{1l}$ are tuning parameters for controller $C_1$; $P_{21}, P_{22}, \ldots, P_{2l}$ are tuning parameters for controller $C_2$; $\ldots$; and $P_{M1}, P_{M2} \ldots, P_{Ml}$ are tuning parameters for controller $C_M$; and b) said control signals of said plurality of the SISO controllers being combined by a combined output setter to produce said controller output.

29. The controller of claim 28, in which said controller output is generated by the said combined output setter in the form:

$$u(t) = R_1 u_1(t) + R_2 u_2(t) + \ldots + (1 - R_1 - \ldots - R_{M-1}) u_M(t),$$

or an equivalent thereof, in which $M=3, 4, 5, \ldots$; $0 \leq u(t) \leq 100$; $0 \leq R_1 \leq 1$; $0 \leq R_2 \leq 1$; $\ldots$; $0 \leq R_{M-1} \leq 1$; $0 \leq R_1 + R_2 + \ldots + R_{M-1} \leq 1$; $R_1, R_2, \ldots, R_{M-1}$ are constants; and $u_1(t)$, $u_2(t)$, and $u_M(t)$ are the outputs of the said SISO controllers, respectively.

30. The controller of claim 28, in which said controller output is generated by the said combined output setter in the form:

$$u(t) = \frac{P_{11}}{K_{sum}} u_1(t) + \frac{P_{12}}{K_{sum}} u_2(t) + \ldots + \frac{P_{Ml}}{K_{sum}} u_M(t),$$

$$K_{sum} = P_{11} + P_{21} + \ldots + P_{Ml},$$

or an equivalent thereof, in which $M=3, 4, 5, \ldots$; $0 \leq u(t) \leq 100$; $P_{11}, P_{21}, \ldots, P_{Ml}$ are gains for controller $C_1$, $C_2, \ldots, C_M$, respectively; and $u_1(t)$, $u_2(t)$, and $u_M(t)$ are the outputs of the said SISO controllers, respectively.

31. The controller of claim 1, 21, or 28, in which said combined output setter includes individual controls that can be set freely within said output range to produce said controller output.

32. The controller of claim 1, 21, or 28, in which the said controller output is re-scalable from the 0 to 100 range to an engineering value range by using a linear function.

33. The controller of claim 1, 21, or 28, in which the said controller output is arranged to include selectable control limits or control constraints.

34. The controller of claim 1, 21, or 28, in which said controller is a computer program embodied in a digital medium.

* * * * *